April 22, 1969  F. J. SACKLEH  3,439,885
BRONZE WOOL SHIELD FOR AEROSPACE AND ATMOSPHERIC VEHICLES
Filed July 6, 1967
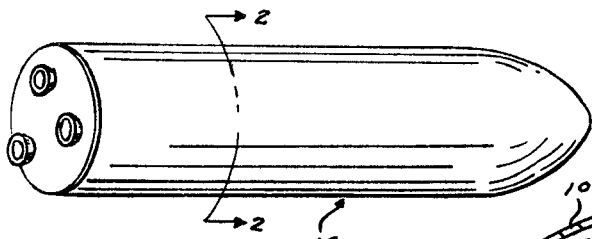
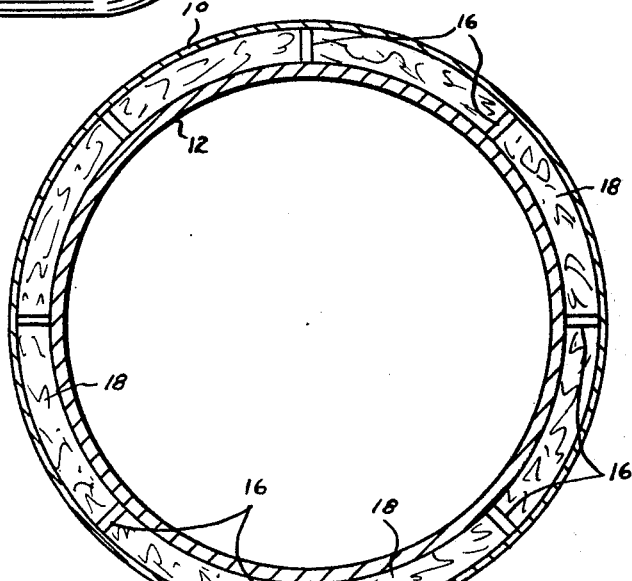
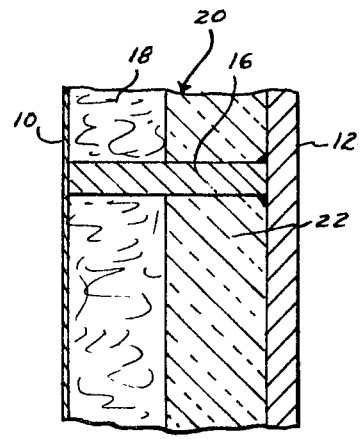
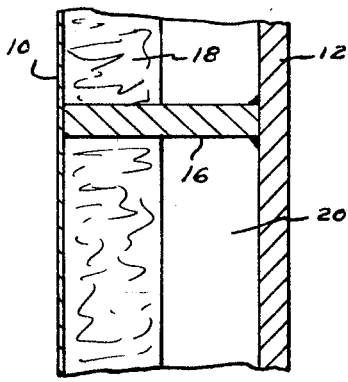
INVENTOR.
FRED J. SACKLEH
BY Harry A. Herbert Jr
ATTORNEY
Richard J Killoren
AGENT

United States Patent Office 3,439,885
Patented Apr. 22, 1969

3,439,885
BRONZE WOOL SHIELD FOR AEROSPACE AND ATMOSPHERIC VEHICLES
Fred J. Sackleh, 4300 Pennlyn Ave.,
Dayton, Ohio 45429
Filed July 6, 1967, Ser. No. 651,629
Int. Cl. B64d *45/00*; B64g *9/00*
U.S. Cl. 244—1      4 Claims

ABSTRACT OF THE DISCLOSURE

Protection against hypervelocity impact in aerospace and atmospheric vehicles is provided by a layer of bronze wool secured to the outer surface of the load-carrying structural wall of the enclosure of the vehicle. A thin outer structural wall surrounds the layer of bronze wool.

Background of the invention

Various means have been proposed for providing protection against hypervelocity projectiles such as meteoroids in space and planetary environments or pellets used as kill mechanisms in space or planetary environments. Armour shielding, bumper shielding, dustwall shielding and the use of fiber material are known means for obtaining protection from hypervelocity projectiles in aerospace vehicles, atmospheric vehicles and ground shelters.

With atmospheric vehicles or aerospace vehicles weight of the shielding becomes a problem. To overcome the weight problem of the armour plating and bumper shielding, the use of dustwall shielding has been proposed in which a layer of small metallic particles forms what is analogous to a metallic atmosphere around the surface of the space vehicle. However, with the dustwall shield, some means must be provided for maintaining the cloud of metallic particles around the vehicle such as by the use of either a mechanical or electrostatic field. Also, this system must provide means for supplying additional material to replenish the material lost or deposited on the vehicle surface. The uses of metal and glass fibers for meteroid protection have been described in articles by Frank L. Zimmerman, pp. 104–105, vol. 2, No. 1, "Journal of Spacecraft and Rockets," January–February 1965; by John F. Lundeberg et al., pp. 182–186 and by J. F. Lundeberg, pp. 281–282, of vol. 3, No. 2, "Journal of Spacecraft and Rockets," February 1966.

Tests have shown that the most effective of these are steel wool fibers. However, in pounds per square meter of surface, steel wool shields have about five times the weight of the dust-wall shield.

Summary of the invention

According to this invention, an inclosure for the aerospace vehicle has a thick mass of bronze wool secured to the outer surface of the load-carrying structural wall of the vehicle. In tests made, bronze wool was found to offer a 25% weight reduction over steel wool for the same degree of protection. To provide a smooth outer surface, where needed, a thin outer structural wall is provided outside of the bronze wool. The outer structural wall is supported on the inner structural wall by either rod or rib supports.

Brief description of the drawing

FIG. 1 is an isometric view of one type of vehicle which may use the shielding apparatus of the invention;

FIG. 2 is a sectional view of the wall structure of the vehicle of FIG. 1 along the line 2—2;

FIG. 3 is an enlarged cutaway view of a portion of the wall structure of FIG. 2;

FIG. 4 shows a modified wall structure for the device of FIG. 2 according to another embodiment of the invention; and FIG. 5 shows further modified wall structure according to another embodiment of the invention.

Detailed description of the invention

Reference is now made to FIGS. 1 and 2 of the drawing which show an aerospace vehicle having wall structure as shown in FIG. 2. An outer structural wall 10 surrounds the load-carrying structural wall 12 of space vehicle 14. The outer structural wall is secured to and supported by means of spaced supports 16. Either rods or ribs may be used for the supports 16. Bronze wool 18 is secured to the inner structural wall 12 by any well-known means such as an adhesive. It has been found that metal fiber shields provide a greater protection against high velocity projectiles than against low velocity projectiles. However, the greater the density of the bronze wool, the greater the protection against low velocity projectiles. The density of the bronze wool used therefore involves a trade-off between low velocity projectile protection desired and the weight of the shielding material. Depending upon the use, the outer structural wall may either be a thin layer of the same material as the inner wall secured to the supports 16 by spot welding or by an adhesive, or it could be a surface material sprayed onto the outer surface of the bronze wool.

The bronze fibers do not provide good thermal insulation so when needed a space 20 may be provided between the bronze wool and the inner structural wall 12 as shown in FIG. 4. In this case, the bronze wool is secured to the outer wall member 10 and supports 16 with an adhesive. The space 20 may be filled with an insulating material 22 such as fiberglass as shown in FIG. 5 which will provide thermal insulation and also provide some shielding protection.

There is thus provided an improved shielding wall structure for aerospace vehicles which overcomes some of the difficulties and weight problems of prior art structures.

While certain specific embodiments have been described, it is obvious that numerous changes may be made without departing from the general principles and scope of the invention.

I claim:
1. An enclosure for an aerospace vehicle comprising: a hollow metal body forming a pressure and load bearing wall member for said aerospace vehicle; means including a thick layer of bronze wool around said hollow metal body and supported by the outer surface of said wall member, for providing a protective shield against high velocity particles.

2. The device as recited in claim 1 including a second wall member surrounding said bronze wool and means for supporting said second wall member on said first wall member.

3. The device as recited in claim 2 wherein the bronze wool is spaced from said first wall member and indirectly supported thereby through said second wall member on said second wall support means.

4. The device as recited in claim 3 wherein the space between said bronze wool and said first wall member is filled with glass fiber insulating material.

References Cited

UNITED STATES PATENTS

| 2,676,773 | 4/1954 | Sanz et al. | 244—135 |
| 3,270,908 | 9/1966 | Faget et al. | 244—1 |
| 3,286,665 | 11/1966 | Wygant et al. | 109—82 |

FOREIGN PATENTS 490,134   8/1938   Great Britain.

FERGUS S. MIDDLETON, *Primary Examiner.*

U.S. Cl. X.R.

244—135; 29—419, 455; 220—9; 89—36; 102—105